United States Patent [19]

Jones

[11] Patent Number: 5,097,638

[45] Date of Patent: * Mar. 24, 1992

[54] COVER HOLD-DOWNS UTILIZING BOTTLES WITH PIERCED FLANGES

[76] Inventor: Frederick L. Jones, 1401 SE. 15th St., Ft. Lauderdale, Fla. 33316

[*] Notice: The portion of the term of this patent subsequent to Dec. 25, 2007 has been disclaimed.

[21] Appl. No.: 493,775

[22] Filed: Mar. 15, 1990

Related U.S. Application Data

[63] Continuation-in-part of Ser. No. 296,321, Jan. 11, 1989.

[51] Int. Cl.⁵ .......................... B62D 63/04; E04B 1/34
[52] U.S. Cl. ..................................... 52/3; 215/100 A; 215/32; 215/101
[58] Field of Search ..................... 52/3, 4; 215/100 A, 215/32, 35, 101

[56] References Cited

U.S. PATENT DOCUMENTS

| 19,689 | 3/1858 | Dinsmoor | 52/4 |
|---|---|---|---|
| 358,195 | 2/1887 | Griswold | 52/3 |
| 1,448,811 | 3/1923 | Morrison | 160/349.1 X |
| 2,026,950 | 1/1936 | Miller | 215/100 R |
| 2,799,882 | 7/1957 | Falk | 215/101 |
| 3,000,527 | 9/1961 | Jennings et al. | 215/100 A |
| 3,036,371 | 5/1962 | Gray et al. | 215/100 A X |
| 3,162,920 | 12/1964 | Durham | 52/4 |
| 3,612,595 | 10/1971 | Updegraff | 215/100 A X |
| 3,620,410 | 11/1971 | Griese | 215/100 A X |
| 3,664,070 | 5/1972 | Golay | 52/4 |
| 3,982,755 | 9/1976 | Sarich | 272/117 |
| 3,990,596 | 11/1976 | Hoffman | 215/100 A |
| 4,357,042 | 11/1982 | Gall | 215/100 A X |
| 4,368,826 | 1/1983 | Thompson | 215/100 A |
| 4,580,372 | 4/1986 | Osborn | 52/3 |
| 4,979,339 | 12/1990 | Jones et al. | 52/3 |

FOREIGN PATENT DOCUMENTS

| 2322478 | 11/1974 | Fed. Rep. of Germany | 215/100 A |
|---|---|---|---|
| 387197 | 7/1908 | France | 52/3 |
| 2291097 | 7/1976 | France | 215/100 A |
| 144112 | 6/1920 | United Kingdom | 52/3 |
| 644405 | 10/1950 | United Kingdom | 52/4 |

Primary Examiner—David A. Scherbel
Assistant Examiner—Kien Nguyen
Attorney, Agent, or Firm—Victor F. Volk

[57] ABSTRACT

Fabric covers are weighted down by means of water-filled plastic bottles that have neck flanges with holes through them. Cords that connect to clamps for gripping the covers are tied through these holes.

9 Claims, 1 Drawing Sheet

FIG. 1
FIG. 3
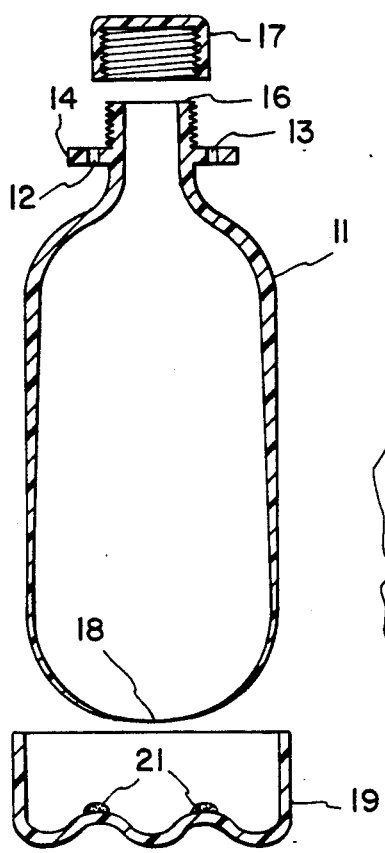
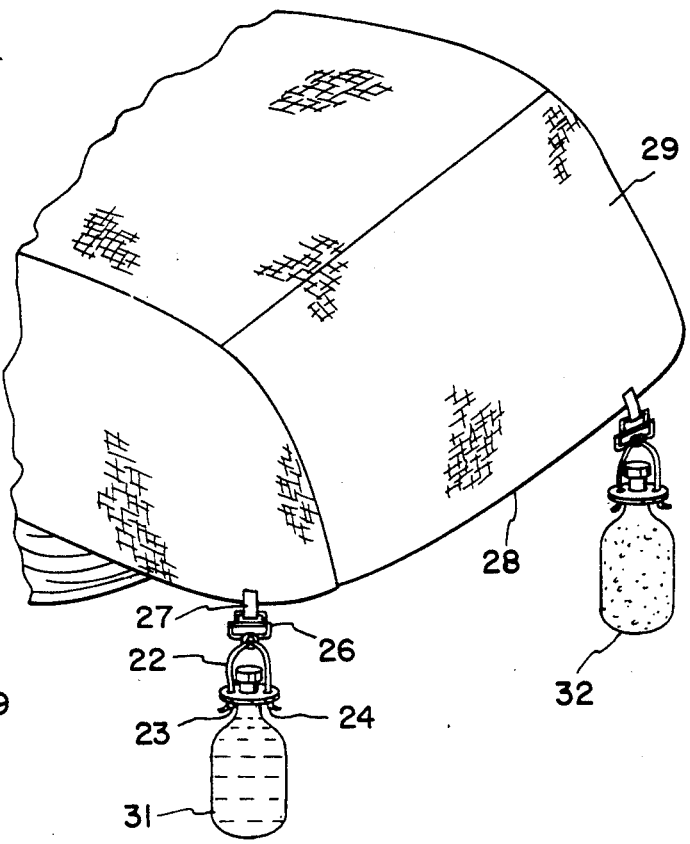
FIG. 2
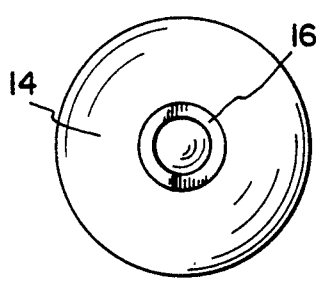
FIG. 4
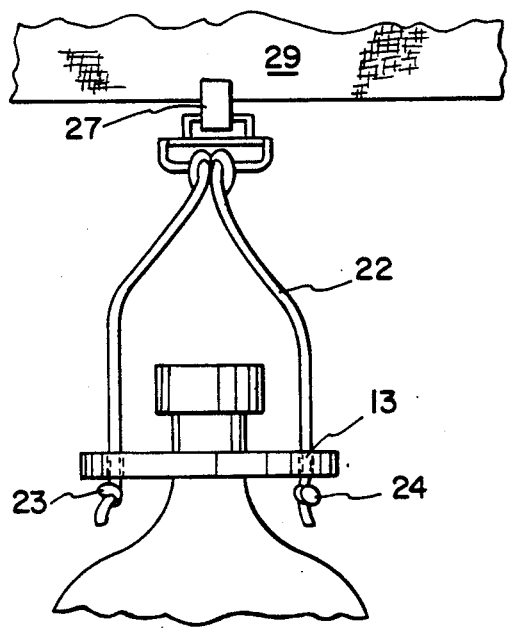

COVER HOLD-DOWNS UTILIZING BOTTLES WITH PIERCED FLANGES

This application is a continuation-in-part of pending application Ser. No. 296,321 filed Jan. 11, 1989.

BACKGROUND OF THE INVENTION

The parent application describes fabric covers that are held down by means of bottles weighted with water, sand, or the like. The bottles therein described are attached to the covers by means of collars that fit against the bottle caps and are, in turn, connected to elastic cords that can be clamped to the cover fabric. Additionally, with reference to the present invention, it is known that plastic bottles are in common use that have flanges extending from their necks. Such a bottle is shown in U.S. Pat. No. Des. 254,357.

A need exists for convenient and inexpensive means to weight down fabric covers such as automobile and boat covers, protective tarpaulins on building materials, and even bed sheets. It is a great advantage if the heavy element of the weighting means is available at or close by the site of its use and does not have to be transported to or away from that site. It would also be an advantage to eliminate the need for the collars of the abovementioned application since these will eventually wear out and, in any case, will fit only one bottle-neck size.

SUMMARY OF THE INVENTION

I have invented a weighted fabric cover that comprises a fabric sheet attached to plastic bottles containing water or sand, etc. for ballast. The bottles are molded with integral neckflanges, and the flanges are pierced by holes through which cords are passed. These cords are preferably elastic, at least in part of their lengths and are attached to the flanges at one end and to clamps at the other. The clamps grip the edges of the cover to keep it taut, or at least keep it from blowing off.

BRIEF DESCRIPTION OF THE DRAWING

FIG. 1 is a section of a bottle made in accordance with my invention.

FIG. 2 is a plan view of the bottle of FIG. 1 with the cap removed.

FIG. 3 is a perspective view of a portion of a car cover of my invention.

FIG. 4 is a detail of the attachment of a cord in my invention.

DETAILED DESCRIPTION OF A PREFERRED EMBODIMENT

Referring first to FIG. 1 a plastic beverage bottle 11 comprised of a synthetic polyester in a known manner except for holes 12, 13 in a flange 14 on a threaded neck 16 has a close fitting plastic cap 17. The bottle 11 is rounded at its bottom 18 but is enabled to stand by means of a plastic base 19 that is permanently bonded to it by cement deposits 21—21. The flange 14, which is an integral element of the neck 16 has a diameter of 1¾ inches. This is somewhat larger than the flanges on presently used beverage bottles to accommodate the holes 12, 13 which are a novel feature of the present invention. The bottle 11 comprises the base 19 because of its rounded bottom and attenuated wall thickness of about 10 thousandths of an inch (0.254 mm) but thicker-walled one-piece plastic bottles can also be used in the practice of my invention within the scope thereof.

In FIG. 4 an elastic cord 22 is shown with both ends inserted through the holes 12, 13 and knotted at knots 23, 24 which are too large to pass through the holes, thus attaching the cord to the flange. A strap 26 that is looped around the cord 22 is connected to a clamp 27 that grips the edge 28 of a cover 29 (FIG. 3). In FIG. 3 a bottle 31 has been filled with water to weight it down and another bottle 32 has been weighted down with sand. Occasions may also arise when it is desirable to use bottles containing the original beverage. For example, to hold down the table covers at a picnic, bottles may be used as purchased until the beverage is needed and then filled with water. Although I have preferred to use elastic cords for the cords 22 my invention is not limited thereto and non-stretching cords will also have application within its scope. My invention will also include means other than knots to prevent the cords from pulling out of the holes 12, 13. Known types of compression grips may be used or the cords may be passed down through one hole and up through the other. Nor is the number of flange holes critical to the usefulness of my invention provided that they are not so numerous as to unduly weaken the flange or increase the cost of manufacture.

In the practice of my invention bottles are manufactured with the described holes in the flanges. But my conception also includes the drilling of one or more holes in the flange of a purchased plastic bottle and the passage therethrough of a suitable cord with clamp attachment for weighting down a fabric cover. After a cover has been draped over the object, such as a car, a boat, a bed, etc., a plurality of weighted bottles, with cords and clamps attached through the flange holes, are distributed around the area beneath the cover and the clamps made to grip the cover edges.

The foregoing has been exemplary rather than definitive or my invention for which Letters Patent are sought as defined in the appended claims.

I claim:

1. A weighting device comprising:
    (A) a plastic bottle comprising:
        (1) a container portion,
        (2) a neck extending from said container portion,
        (3) an integral flange extending from said neck,
        (4) walls of said flange defining at least one hole therethrough,
    (B) cord means passing through said hole and attached to said flange.

2. The device of claim 1 wherein said flange comprises walls defining two holes.

3. The device of claim 1 wherein said cord means is elastic.

4. The device of claim 1 wherein said botle is weighted with water.

5. The device of claim 1 wherein in said bottle is weighted with particulate solid material.

6. A weighted fabric cover comprising:
    (A) a sheet of fabric disposable over an object to be covered,
    (B) at least one plastic bottle, said bottle comprising:
        (1) a container portion,
        (2) a neck extending from said container portion,
        (3) an integral flange extending from said neck,
        (4) walls of said flange defining at least one hole therethrough,
    (C) cord means passing through said hole and attached to said flange.

7. The cover of claim 6 comprising clamp means attaching said cord means to said sheet.

8. The cover of claim 6 wherein said cord means is elastic.

9. The cover of claim 6 wherein said flange comprises walls defining two holes.

* * * * *